United States Patent
Esposito et al.

(10) Patent No.: US 9,811,527 B1
(45) Date of Patent: Nov. 7, 2017

(54) METHODS AND APPARATUS FOR DATABASE MIGRATION

(71) Applicant: EMC IP Holding Company LLC, Hopkinton, MA (US)

(72) Inventors: Jeffrey D. Esposito, North Kingstown, RI (US); Haji R. Aref, Foxborough, MA (US); David S. Reiner, Lexington, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 845 days.

(21) Appl. No.: 14/041,160

(22) Filed: Sep. 30, 2013

(51) Int. Cl.
*G06F 7/00* (2006.01)
*G06F 17/30* (2006.01)

(52) U.S. Cl.
CPC .. *G06F 17/30174* (2013.01); *G06F 17/30079* (2013.01)

(58) Field of Classification Search
CPC ................................................ G06F 17/30079
See application file for complete search history.

(56) References Cited

U.S. PATENT DOCUMENTS

2003/0177146 A1* 9/2003 Zimowski ............. G06F 17/303

\* cited by examiner

*Primary Examiner* — Ajith Jacob
(74) *Attorney, Agent, or Firm* — Ryan, Mason & Lewis, LLP

(57) ABSTRACT

Methods and apparatus are provided for database migration. Source databases are migrated to a target data environment by receiving a user selection of one or more of the source databases; receiving a user selection of a target data environment profile; receiving a user selection of one or more storage options for the target data environment; and providing the user with an assessment of whether one or more of the selected source databases can be one or more of migrated and consolidated to the selected target data environment. A user can specify a backup and recovery profile for the migrated database. Metadata affinity can optionally be analyzed for a plurality of the selected source databases to identify an affinity correlation across the selected source databases. Scripts and/or transform blueprints can be generated for the selected target data environment (optionally based on rule-based best practices).

25 Claims, 6 Drawing Sheets

FIG. 5A

| Database | Table Name | Column Name | Data type | DB TYPE | DB Vendor | Version | Deployment | MBTR |
|---|---|---|---|---|---|---|---|---|
| XXX_DB1 | C_CUSTOMER | C_FIRST | VARCHAR2 | 1 | 1 | 1 | 3 | 16 |
| XXX_DB2 | C_CUSTOMER_ARCHIVE | C_FIRST | VARCHAR2 | 3 | 1 | 1 | 3 | 18 |
| XXX_DB3 | C_CUSTOMER_ANALYSIS | C_FIRST | VARCHAR2 | 2 | 1 | 1 | 3 | 17 |
| XXX_DB2 | C_CUSTOMER_HISTORY | C_FIRST | VARCHAR2 | 3 | 1 | 1 | 3 | 18 |
| XXX_DB3 | C_CUSTOMER_COMPLAINT | C_FIRST | VARCHAR2 | 2 | 1 | 1 | 3 | 17 |

FIG. 5B

| Database | Table Name | Column Name | Data type | DB TYPE | DB Vendor | Version | Deployment | MBTR |
|---|---|---|---|---|---|---|---|---|
| XXX_DB1 | C_CUSTOMER | C_FIRST | VARCHAR2 | 1 | 1 | 1 | 3 | 16 |
| XXX_DB2 | C_CUSTOMER_ARCHIVE | C_FIRST | VARCHAR2 | 3 | 1 | 1 | 3 | 18 |
| XXX_DB3 | C_CUSTOMER_ANALYSIS | C_FIRST | VARCHAR2 | 2 | 1 | 1 | 3 | 17 |
| XXX_DB2 | C_CUSTOMER_HISTORY | C_FIRST | VARCHAR2 | 3 | 1 | 1 | 3 | 18 |
| XXX_DB3 | C_CUSTOMER_COMPLAINT | C_FIRST | VARCHAR2 | 2 | 1 | 1 | 3 | 17 |
| YYY_DB5 | C_CUST | FIRST_NAME | VARCHAR | 1 | 2 | 2030 | 1 | 2004 |

METHODS AND APPARATUS FOR DATABASE MIGRATION

FIELD OF THE INVENTION

The present invention relates generally to techniques for database migration.

BACKGROUND OF THE INVENTION

Database migration is the process of transferring one or more source databases to a target data environment. There are, of course, numerous challenges encountered during a database migration that must be identified and addressed. Existing database migration techniques, however, are largely reliant on individual skill level, do not permit user specification of desired target data properties and do not achieve best practice configurations for targeted data and storage environments, tier alignment, or ongoing daily operations including backup and recovery, data manipulation, and general systemic maintenance. In addition, existing database migration techniques can result in inconsistent and poor results during actual migration.

A need therefore exists for methods and apparatus for migrating one or more source databases to a target data environment that identify such challenges and provide interactive and proactive analysis of the user-specified database migration configuration using a combination of gathered performance metrics, embedded and encapsulated best practices, and criteria selection. Yet another need exists for interactive database migration tools that automatically generate and tune a target data configuration using, for example, rules, best practices, tradeoff analysis and/or a holistic view of desired properties of a data environment.

SUMMARY OF THE INVENTION

The present invention in the illustrative embodiments described herein provides methods and apparatus for database migration. In accordance with an aspect of the invention, one or more source databases are migrated to a target data environment by receiving a user selection of one or more of the source databases; receiving a user selection of a target data environment profile; receiving a user selection of one or more storage options for the target data environment; and providing the user with an assessment of whether one or more of the selected source databases can be one or more of migrated and consolidated to the selected target data environment.

According to a further aspect of the invention, a user can also specify a backup and recovery profile for the migrated database. The user can optionally select the backup and recovery profile for the migrated database from a list of available backup and recovery profiles. In addition, the user can optionally specify one or more blackout windows when the migrated database will be unavailable during a backup.

Metadata affinity can optionally be analyzed for a plurality of the selected source databases to identify an affinity correlation across the selected source databases.

According to another aspect of the invention, one or more scripts and/or transform blueprints can be generated for the selected target data environment. The exemplary scripts migrate the selected source databases to the target database environment and can be guided by one or more rule-based best practices. In addition, the scripts can be optionally stored in a repository for subsequent re-use and modification.

Another aspect of the invention can optionally identify one or more causes of migration scenario failure for a selected source database that cannot be migrated and/or consolidated to the selected target database environment. A tier alignment process optionally reconciles selected data objects and properties against one or more rule-based best practices.

The database migration techniques of the illustrative embodiments overcome one or more of the problems associated with the conventional techniques described previously. These and other features and advantages of the present invention will become more readily apparent from the accompanying drawings and the following detailed description.

BRIEF DESCRIPTION OF THE DRAWINGS

FIGS. 5A and 5B illustrate exemplary computations of exemplary Metadata Base Type Ranks by the database migration criteria evaluation process of FIG. 4.

DETAILED DESCRIPTION

Aspects of the present invention provide methods and apparatus for database migration. According to one aspect of the invention, a disclosed data migration engine enables effective content and data storage configurations in business data consolidation, migration, and repurposing. According to another aspect of the invention, the disclosed data migration engine generates a migration design including scripts and configuration specifications that account for operational service level objectives such as Backup and Recovery for a targeted Data Environment (DE). The disclosed data migration engine also optionally evaluates and permits correction of a proposed target Data Environment configuration. The exemplary data migration engine optionally generates one or more of scripts and Open Virtualization Format (.ovf) files used for consolidation and migration operations.

As discussed hereinafter, the exemplary data migration engine 200 resolves content transform requirements to storage design thresholds based upon rule evaluation. In one exemplary embodiment, the data migration engine 200 interacts with a database virtualization engine based on transform content. See, for example, U.S. Pat. No. 9,350,068, issued on Apr. 5, 2016, entitled "Method and Apparatus for Database Virtualization," incorporated by reference herein. While the exemplary data migration engine 200 is illustrated herein in conjunction with a database virtualization engine, such a database virtualization engine is not required for all embodiments.

The exemplary data migration engine 200 can optionally facilitate migration planning and execution from one database appliance environment (e.g., Oracle Exadata) to an alternate environment (e.g., Oracle on an EMC Proven High Performance Solution using VMAX® and VNX® storage or on VCE Vblock technology). Other applicable source environments include Teradata, DB2,and SQL Server, and target environments can also include, for example, DB2 and SQL Server on EMC or VCE infrastructure.

Figure 1:
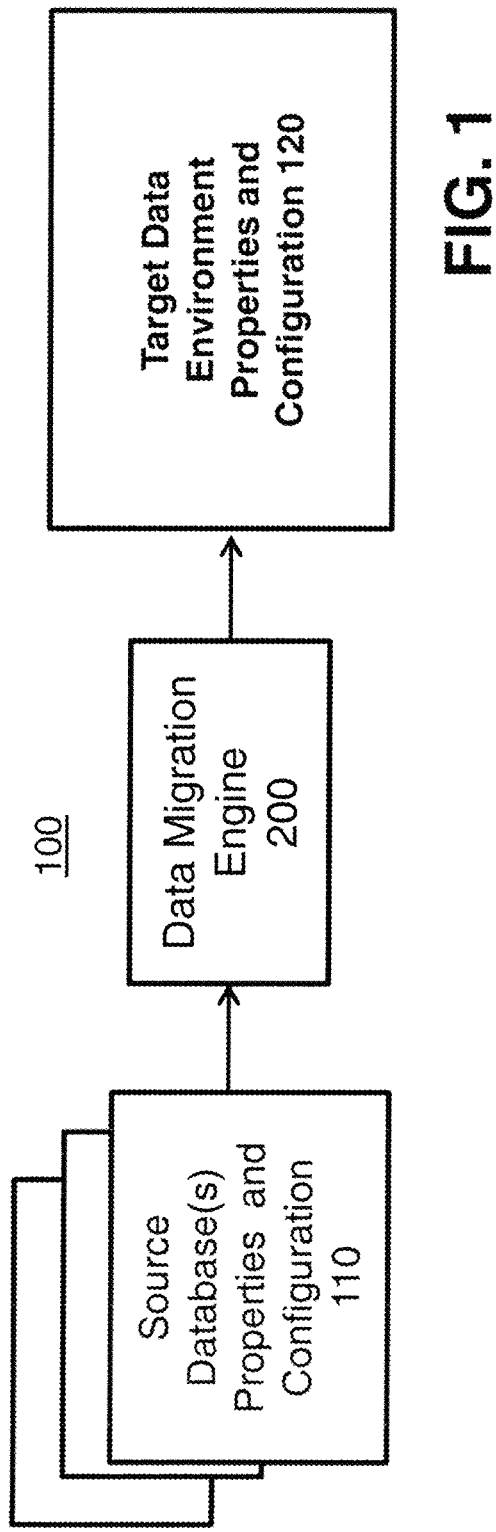
FIG. 1 illustrates an exemplary database migration environment in which the present invention may be employed.

FIG. 1 illustrates an exemplary database migration environment 100 in which the present invention may be employed. As shown in FIG. 1, an exemplary data migration engine 200, as discussed further below in conjunction with FIG. 2, migrates properties and configuration of one or more selected source databases 110 into properties and configuration of a target data environment 120.

Figure 2:
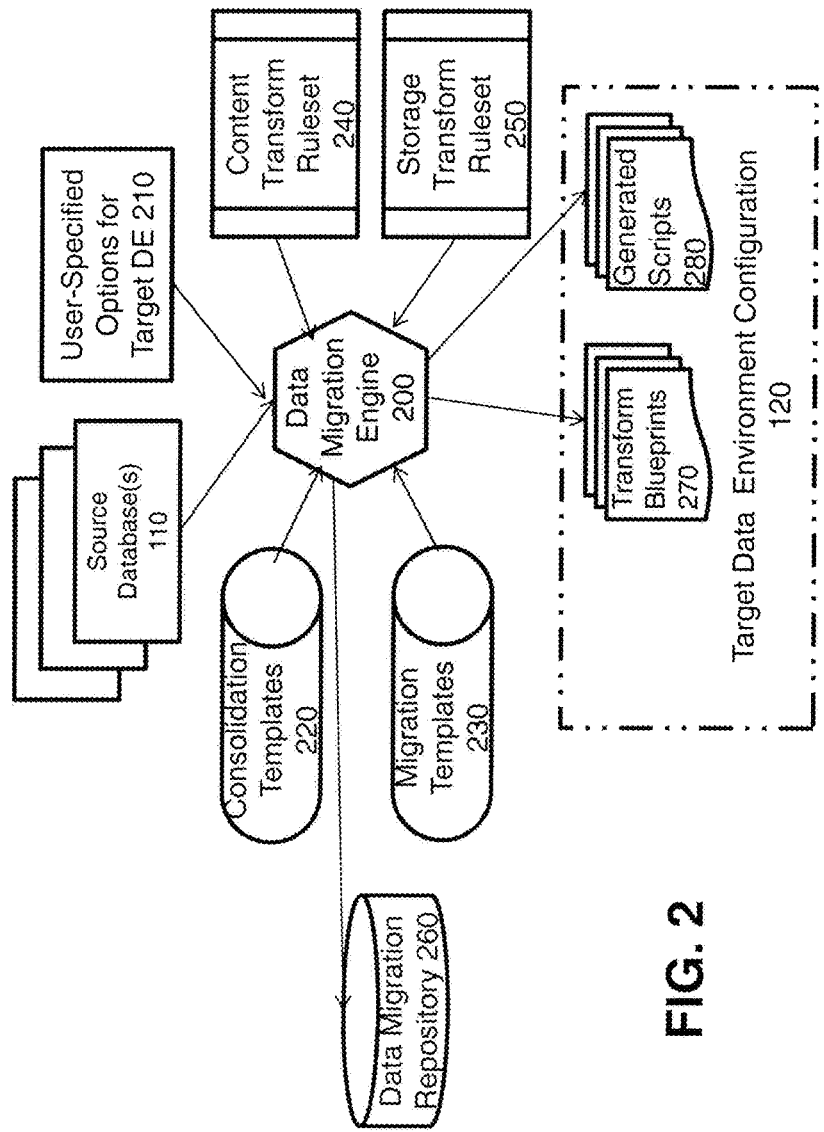
FIG. 2 illustrates the exemplary database migration environment of FIG. 1 in further detail.

FIG. 2 illustrates the exemplary database migration environment of FIG. 1 in further detail. As shown in FIG. 2, the exemplary data migration engine 200 receives a user selection of one or more source databases 110, as well as user-specified options 210 for the target data environment 120. The exemplary data migration engine 200 employs one or more consolidation templates 220 and/or one or more migration templates 230 that provide optimized guidance in all configuration aspects in the form of preset options that align with specific desired database migration outcomes and can be optionally extended by the user to create new templates, thereby easing reference and design of complex migration scenarios.

In addition, the exemplary data migration engine 200 employs a content transform ruleset 240 that controls data compression, transformation, and memory size factoring in the context of database type and purpose and/or a storage transform ruleset 250 that controls drive type/count by storage pool, storage tier design and alignment to business data by target platform.

An exemplary content transform ruleset 240 comprises:

| CType | Block | Buffer | Kernel | CTCR | Source DE | Target DE | DB Type |
|-------|-------|--------|--------|------|-----------|-----------|---------|
| 3 | 16 | 2 | 1 | 7 | 6 | 5 | 2 | where:
CTR ID is a generated ruleset identifier;
CTR Code is a codified descriptor used for array filtering (Ora11gExEMChpO2ODW);
  Oracle 11 g Exadata to EMC high performance targeting an Oracle Data warehouse;
Ctype is an assigned compression type code (e.g., 3=Oracle HCC OLTP);
Block is data block size in use (8, 16, 32, 64);
Buffer is a vendor specific memory unit code, e.g.. rounded up to the thousands;
  For Oracle, size of buffer cache bytes=db_block_buffers*data block size;
Kernel is an assigned OS code (e.g., 1 for RHEL 6.x);
CTCR is an assigned compression translation complexity rating (7 for Oracle HCC OLTP compression in a data warehouse deployment), where a higher CTCR reflects a larger degree mismatch of compression type to database type;
Source data environment is a database vendor/implementation code (e.g., 6=Oracle Exadata multinode RAC);
Target data environment is the same (5=EMC high performing open architecture)
Database Type is a code (e.g., 2=Data Warehouse)

As discussed further below, the exemplary data migration engine 200 optionally generates one or more Transformation Blueprints 270 through a graphical user interface (GUI) interface. The Transformation Blueprints 270 typically comprise configuration checklists and advisories. In addition, the exemplary data migration engine 200 optionally generates one or more generated scripts 280 that aid and implement the actual migration to the target data environment 120. For example, the exemplary data migration engine 200 can produce migration scripts 280 to transform and align Oracle's proprietary HCC (hybrid columnar compression) compressed tables to standard Oracle table organization and tier assignment on EMC storage.

Aspects of the present invention provide a database migration evaluation process 300, discussed further below in conjunction with FIG. 3, and the database migration engine 200, discussed further below in conjunction with FIG. 6, that can be employed to consolidate, migrate and/or repurpose one or more source databases 110 within the target database migration environment 100. The database migration evaluation process 300 and database migration engine 200 forecast and confirm design and operational elements for database migration. As discussed hereinafter, the exemplary database migration evaluation process 300 and database migration engine 200 simplify the complexities of sizing, tiering and consolidation and/or migration of the selected source databases 110 to a target database environment 120.

Figure 3:
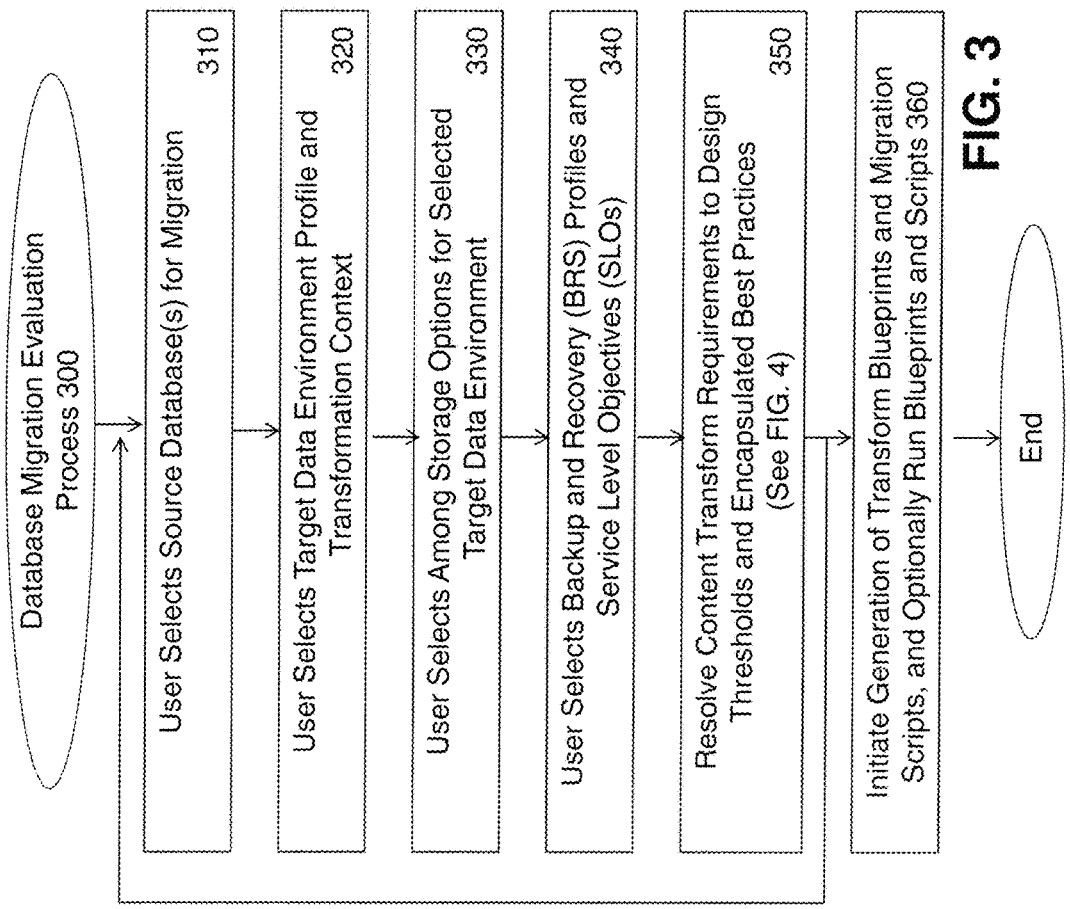
FIG. 3 is a flow chart describing an exemplary implementation of a database migration process incorporating aspects of the present invention.

FIG. 3 is a flow chart describing an exemplary implementation of a database migration evaluation process 300 incorporating aspects of the present invention. As shown in FIG. 3, the exemplary database migration evaluation process 300 initially guides a user through selection of one or more databases 110 for migration during step 310. For example, the user can be presented with a list of the existing source databases 110 of the enterprise for selection. The list of the existing actual databases can optionally present associated performance metrics and/or additional information for each identified database. For example, the presented performance metrics can include a score or a health assessment, such as a Green/Yellow/Red indicator based on predefined performance thresholds. In addition, a user can be provided with a Go/No Go dashboard view with reasoned messaging. In this manner, technical and operational root causes of potential consolidation and/or migration impacts can be identified, in advance of implementation.

Thereafter, the user selects a target database environment 120 profile and transformation context during step 320. For example, the user can be presented with a list of available target database environments 120 for selection.

During step 330, the user selects among storage options for the selected target database environment 120 (e.g., the actual storage system). For example, the user can be presented with a list of available storage options for selection, optionally with the model information and/or associated performance specifications of each available storage option. In one exemplary embodiment. existing in-place storage of the enterprise can be a default selection.

The user selects backup and recovery (BRS) profiles and service level objectives (SLOs) during step 340. For example, the user can be presented with one or more target-based de-duplication options (with a greater burden on the network, affecting the network weighting below), such as data domain model options, and/or one or more source-based de-duplication options (with a greater burden on the host affecting the CPU weighting below), such as Avamar options to backup the VMWare environment. In addition, during step 340, the user can also specify the acceptable blackout windows when the database wilt be unavailable during backup.

As discussed further below in conjunction with FIG. 4, the database migration evaluation process 300 evaluates database migration criteria during step 350 to resolve content transform requirements to design thresholds and encapsulated best practices. The results can optionally he presented to the user. For example, the database migration evaluation process 300 can indicate to the user whether the selected database migration will work in the selected target database environment. The user can also optionally click on failing database migration candidates to see any incompatibility (e.g., too memory/CPU intensive for selected host; or backup window mismatch). In this manner, the user can select a failing database migration candidate and correct any problems, for example, by returning to one or more of steps 310, 320, 330 and 340 to revise one or more aspects of the current database migration criteria.

The database migration evaluation process 300 then initiates generation of transform blueprints 270 and migration scripts 280 during step 360, and optionally allows the user to run such transform blueprints 270 and migration scripts 280. For example, the user can optionally click on passing database migration candidates presented during step 350 to generate and run script files.

Figure 4:
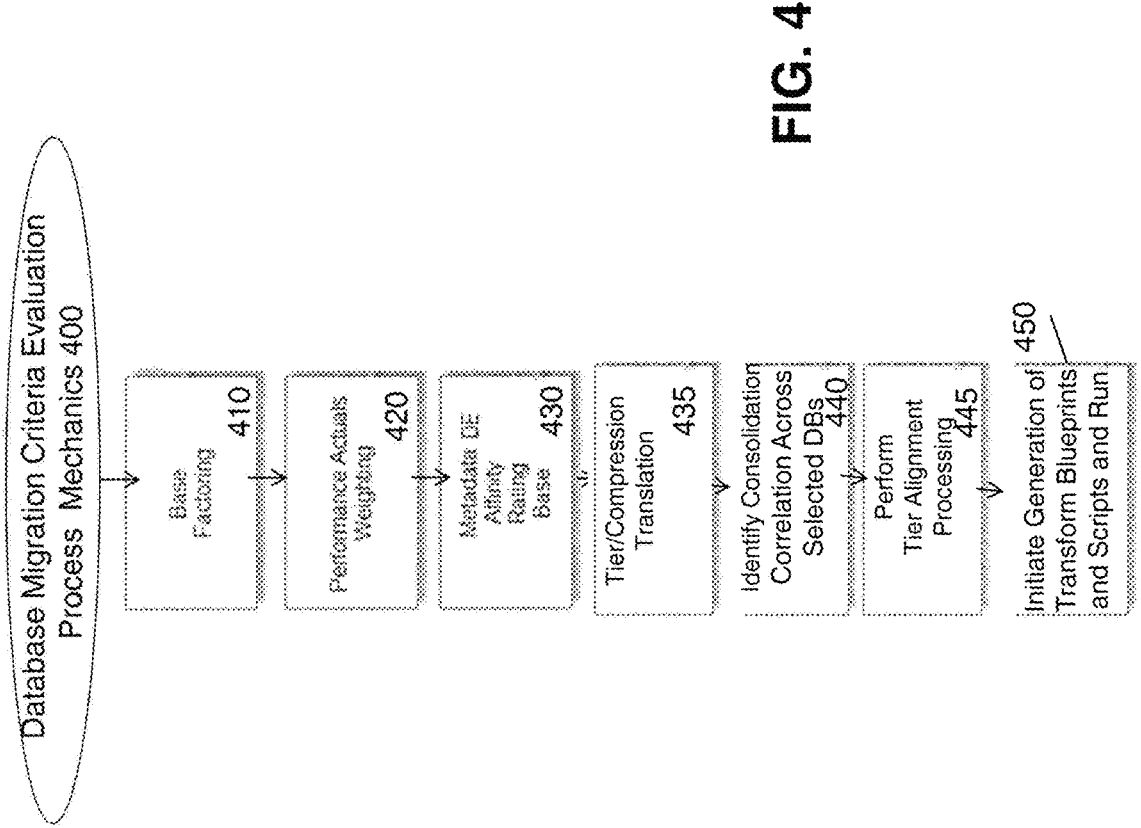
FIG. 4 is a flow chart describing an exemplary implementation of a database migration criteria evaluation process incorporating aspects of the present invention.

FIG. 4 is a flow chart describing an exemplary implementation of a database migration. criteria evaluation process 400 incorporating aspects of the present invention. As indicated above, the database migration criteria evaluation process 400 is executed during step 350 of the database migration evaluation process 300. The exemplary database migration criteria evaluation process 400 optionally performs a hash check prior to executing to identify invalid and/or unsupported combinations of user selections during steps 310, 320, 330 and 340 of FIG. 3. If an invalid combination is detected, the database migration criteria evaluation process 400 can provide a notification to the user and stop execution. In addition, the database migration criteria evaluation process 400 determines a complexity rating for the target technology based on a degree of partial match. For example, a BRS Source de-duplication with high CPU consumption sets the BRS to a rank of 7 out of ten.

As shown in FIG. 4, the exemplary database migration criteria evaluation process 400 then performs base factoring during step 410. Generally, the base factoring perforated during step 410 retrieves and interprets all core migration factoring criteria and assigns a quantitative score predicated upon the initial compression translation estimate, assigned target tech complexity rating, monitored activity volumes, peak IOPs estimates, and a BRS ranking integer. In this manner, a quantitative weighting and a correct migration technology mix can be assigned.

For example, during step 410, an integer factor assignment can be based on the following performance metrics for the selected environment:

Storage Size, Type, and complexity rating;
Monitored activity volume;
Peak IOPS by monitored storage device for database;
Selected Storage, BRS and Virtualization options;
Selected Migration configuration; and
Initial Compression Translation complexity rating (CTCR).
An exemplary quantitative weighting can be expressed as follows:

$X$=assigned Target Technology complexity rating $A$=(Size category value+$X$)(Storage Type value+$X$)

$B$=(Monitored Activity volume(v$sysmetric))

$C$=(Peak IOPS value+Growth %)

$D$=(BRS rank (BRS product value))

$E$=Initial Compression Translation Estimate $$\text{Base Migration Factoring}=A+B+C+D+E(\text{VBF}) \quad (1)$$

where the Initial Compression Translation Estimate (E) is calculated from the Content Transform Ruleset (Repository) 240 as follows:

$Za$=CType $Zb$=(Block(Buffer))Kernel $Zc$=CTCR $Zd$=Source DE $Ze$=Target DE $Zf$=DB Type Initial Compression Translation Estimate=$Za+Zb+Zc+(Zd-Ze)Zf$ The base factoring data is obtained from the repository 260 for the selected target database environment 120.

As shown in FIG. 4, the exemplary database migration criteria evaluation process 400 weights the actual monitored performance values during step 420, and a corrected migration technology combination can be identified.

Weight values for the performance metrics can be expressed as follows:
Network Utilization (v$IOStat_Network)
Host CPU Event Detailing (v$SGAINFO (size, granule size, free memory),v$SGA_Dynamic*
Disk I/O profiling based on Storage Tier Activity (v$sysmetric)

The correct migration technology combination is then selected based on:
Base Migration Factoring+Weight Value identified The exemplary database migration criteria evaluation process 400 computes a metadata affinity rating for a base during step 430, and top metadata detailing is performed and cataloged as an aid to effective consolidation evaluation of selected source databases An exemplary metadata base type rank can be computed as follows:

$H$=(Type of DB)

$I$=(DB Vendor, Version)

$J$=(Current DBC Monitored database status value (Red, Yellow, Green))

$K$=Deployment (Cluster, Virtual, Standalone)

$$\text{Metadata Base type rank (MBTR)}=(H+I+J+K) \quad (2)$$

Exemplary computations of MBTRs are discussed further below in conjunction with FIGS. 5A and 5B.

The top 10 data structure elements can then be identified based on monitored business data filters or on a data dictionary parse. The unique Metadata element names and types are populated for cross reference across selected source databases 110.

The exemplary database migration criteria evaluation process 400 then performs Tier/Compression Translation during step 435, by collating and correlating compression to tier assignments. An initial compression estimate is obtained based on the selected source databases 110 by looking up against repository Content Transform Rulesets 240 based on source data environment criteria. (The corresponding ruleset is loaded for use as an aid in Base Migration Factoring and Tier/compression translation).

The exemplary database migration criteria evaluation process 400 then identifies consolidation correlation across selected databases during step 440. Metadata affinity rank and detailing can be compared and then the database profile array is updated to appropriately group and associate affinitied databases. Metadata affinity is a quantitative inference of similarity and potential interdependence of a set of metadata elements in one database to an apparently similar set of metadata elements in another.

The exemplary database migration criteria evaluation process 400 then performs Tier Alignment Processing during step 445. Generally, the Tier Alignment Processing comprises reconciling the selected data objects and properties against best practices (Guided Configuration). In one exemplary implementation, the Tier Alignment Processing comprises calculating a Particulate Object Tier Target Suitability (POTTS), as follows:

$$POTTS=L(M-N),$$

where:

L=Tier Target;

M=Working Free; and

N=Threshold

Generally, the POTTS calculation evaluates selected objects by target tier and reconciles against best practices arithmetically. For example, object compression type defined by table/tablespace may result in logic driven realignment of those objects to obtain the best cost to performance ratios for the desired migration scenario.

Finally, the exemplary database migration criteria evaluation process 400 initiates generation of the transform blueprints 270 and migration scripts 280 during step 450 (corresponding to step 360 in FIG. 3), and optionally allows the user to run such generated transform blueprints 270 and migration scripts 280. The findings and results can optionally be posted to a repository 260 for persistence and to the graphical user interface (GUI) for user review and interactive investigation.

FIGS. 5A and 5B illustrate exemplary computations of exemplary Metadata Base Type Ranks by the database migration criteria evaluation process 400 of FIG. 4. FIG. 5A is an example of a strong element affinity. As shown in FIG. 5A, for the Metadata element, "C_FIRST" ("Column Name"), where all instances are implemented using the same database vendor (e.g., Oracle), across databases of various types (e.g., OLTP, Data Wearhouse, and Archive databases), and are all deployed with the same type of deployment (e.g., Real Application Cluster (RAC)), the MBTR computed in accordance with Equation (2) is within +/−2 across all instances of that element, indicating a strong Metadata affinity for that element.

FIG. 5B is an example of a differentiated element affinity, where an additional record has been added to the records of FIG. 5A. As shown in FIG. 5B, for the Metadata element discussed further above in conjunction with FIG. 5A, "C_FIRST" ("Column Name"), where all instances are implemented using the same database vendor (e.g., Oracle), across databases of various types (e.g., OLTP, Data Wearhouse, and Archive databases), and are all deployed with the same type of deployment (e.g., Real Application Cluster (RAC)), the MBTR computed in accordance with Equation (2) is within +/−2 across all instances of that element, indicating a strong Metadata affinity for that element. However the next apparently similar element "FIRST_NAME" ("Column Name"), is arithmetically differentiated because it decodes as SQL Server 2000: which reflects vendor dissimilarity across source data environments and indicates a need guided insight in migration and consolidation in context.

Figure 6:
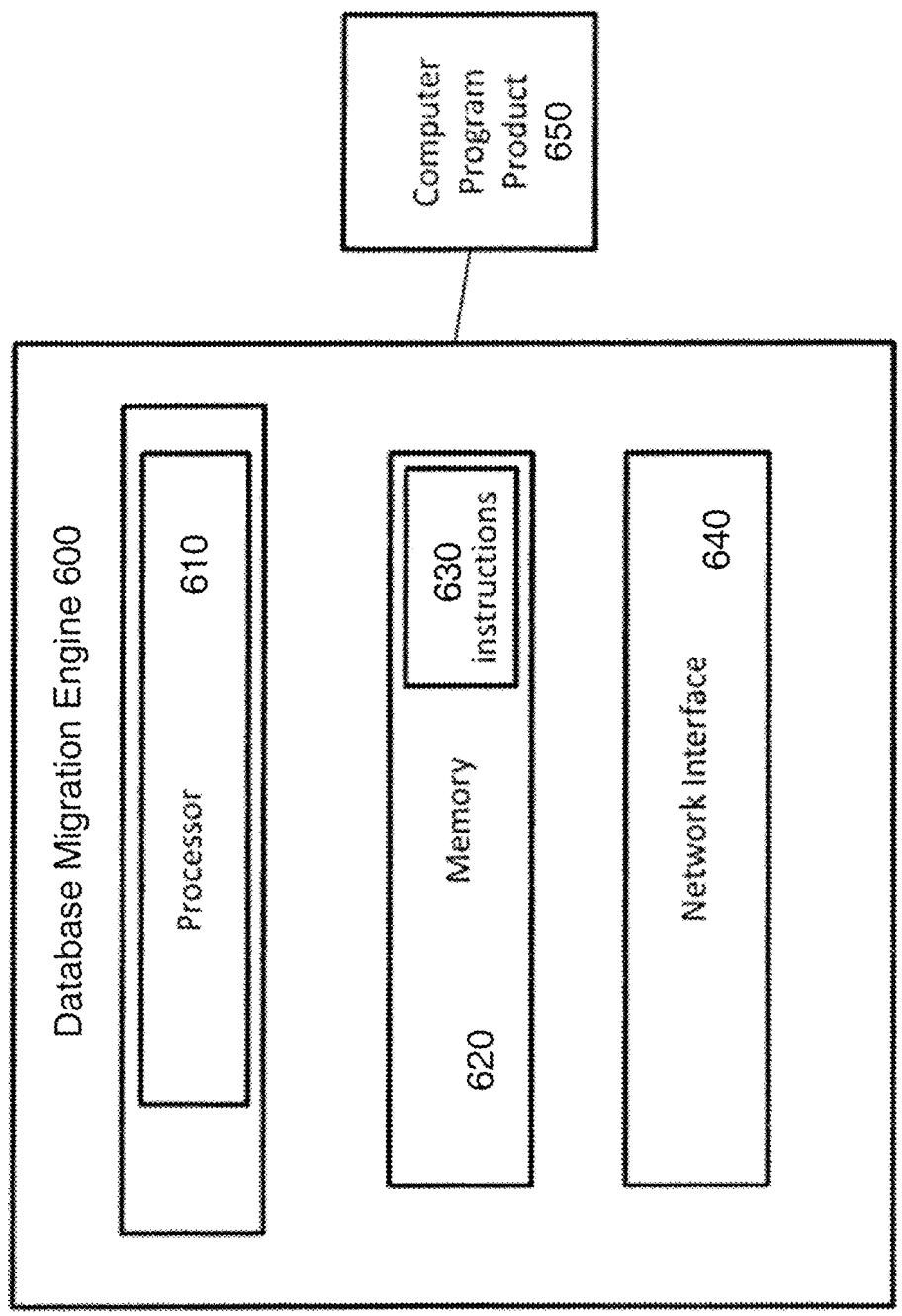
FIG. 6 is a schematic diagram illustrating an exemplary database virtualization engine.

FIG. 6 is a schematic diagram illustrating an exemplary database migration engine (appliance) 600. The exemplary database migration engine 600 includes a processor 610, a memory 620 and a network interface 640.

Memory 620 is configured to store data and code which includes instructions 630 to process the database migration evaluation process 300 of FIG. 3. Memory 620 generally takes the form of, e.g., random access memory, flash memory or a non-volatile memory.

Processor 610 can take the form of, but is not limited to, an Intel or AMD-based MPU, and can be a single or multi-core miming single or multiple threads. Processor 610 is coupled to memory 620 and is configured to execute the instructions 630 stored in memory 620.

Network interface 640 is constructed and arranged to send and receive data over a communications medium. A computer program product 650 may optionally store additional instructions.

In this manner, the exemplary data migration engine 600 provides intelligent, methodical migration planning and interactive "what-if" analysis in the context of user-selected database scenarios through a GUI. The exemplary data migration engine 600 optionally integrates with a virtualization modeler/wizard, as discussed above.

As previously mentioned herein, the above-described embodiments of the invention are presented by way of illustrative example only. Numerous variations and other alternative embodiments may be used. The illustrative embodiments of the invention as described herein provide unproved methods and systems for database migration. It should again be emphasized that the particular embodiments described above are provided by way of illustration, and should not be construed as limiting the present invention to any specific embodiment or group of embodiments. For example, as previously noted, the described embodiments may be adapted in a straightforward manner to operate with other types of migration standards and specifications. Also, the particular configuration of system elements shown in FIGS. 2 and 5, and their interactions as shown in FIGS. 3 and 4. may be varied in other embodiments. Moreover, the various simplifying assumptions made above in the course of describing the illustrative embodiments should also be viewed as exemplary rather than as requirements or limitations of the invention. Numerous alternative embodiments within the scope of the appended claims will be readily apparent to those skilled in the art.

What is claimed is:

1. A method for migrating one or more source databases to a target data environment, comprising:

receiving, using at least one processing device, a user selection of one or more of said source databases stored in at least one memory;

receiving, using at least one processing device, a user selection of a target data environment profile;

receiving, using at least one processing device, a user selection of one or more storage options for said target data environment comprising at least one memory; and providing, using at least one processing device, said user with an assessment of whether one or more of said selected source databases can be one or more of migrated and consolidated to said selected target data environment.

2. The method of claim 1, further comprising the step of receiving a user selection of a backup and recovery profile for said target data environment.

3. The method of claim 2, wherein said step of receiving a user selection of a backup and recovery profile for said target data environment further comprises the step of presenting said user with a list of available backup and recovery profiles.

4. The method of claim 1, further comprising the step of determining a base migration factor for said selected target data environment.

5. The method of claim 1, further comprising the step of analyzing a metadata affinity for a plurality of said selected source databases.

6. The method of claim 5, further comprising the step of identifying an affinity correlation across said plurality of selected source databases.

7. The method of claim 1, further comprising the step of presenting said user with scenario results for said selected target data environment.

8. The method of claim 1, further comprising the step of generating one or more scripts for migrating said selected source databases to said target database environment.

9. The method of claim 8, wherein said step of generating one or more scripts is guided by one or more rule-based best practices.

10. The method of claim 8, further comprising the step of storing one or more of said scripts in a repository.

11. The method of claim 1, further comprising the step of generating one or more transform blueprints for said selected target data environment.

12. The method of claim 1, wherein said step of receiving a user selection of one or more of said source databases for migration further comprises the step of presenting said user with a list of one or more of said source databases for selection.

13. The method of claim 1, wherein said step of receiving a user selection of one or more of said source databases for migration further comprises the step of presenting performance metrics and technical details for one or more of said source databases.

14. The method of claim 1, wherein said step of receiving a user selection of a target data environment profile further comprises the step of presenting said user with a list of available target data environment profiles.

15. The method of claim 1, wherein said step of receiving a user selection of a target data environment profile further comprises the step of presenting said user with specifications for one or more available target data environments.

16. The method of claim 1, further comprising the step of identifying one or more causes of migration scenario failure for a selected source database that cannot be one or more of migrated and consolidated to said selected target database environment.

17. The method of claim 1, further comprising the step of providing one or more incompatibilities delineating a cause of failure for a selected source database that cannot be one or more of migrated and consolidated to said selected target database environment.

18. The method of claim 1, further comprising the step of performing a tier alignment process to reconcile selected data objects and properties against one or more rule-based best practices.

19. A non-transitory machine-readable recordable storage medium for migrating one or more source databases to a target data environment, wherein the one or more software programs when executed by one or more processing devices implement the steps of the method of claim 1.

20. A system for migrating one or more source databases to a target data environment, the system comprising:
a memory; and
at least one hardware device, coupled to the memory, operative to implement the following steps:
receive, using at least one processing device, a user selection of one or more of said source databases stored in at least one memory;
receive, using at least one processing device, a user selection of a target data environment profile;
receive, using at least one processing device, a user selection of one or more storage options for said target data environment comprising at least one memory; and
provide, using at least one processing device, said user with an assessment of whether one or more of said selected source databases can be one or more of migrated and consolidated to said selected target data environment.

21. The system of claim 20, wherein said at least one hardware device is further configured to receive a user selection of a backup and recovery profile for said target data environment.

22. The system of claim 20, wherein said at least one hardware device is further configured to determine a base migration factor for said selected target data environment.

23. The system of claim 20, wherein said at least one hardware device is further configured to generate one or more of a script for migrating said selected source databases to said target database environment and a transform blueprint for said selected target data environment.

24. The system of claim 20, wherein said at least one hardware device is further configured to identify one or more causes of migration scenario failure for a selected source database that cannot be one or more of migrated and consolidated to said selected target database environment.

25. The system of claim 20, wherein said at least one hardware device is further configured to perform a tier alignment process to reconcile selected data objects and properties against one or more best practices.

\* \* \* \* \*